United States Patent Office 2,771,469
Patented Nov. 20, 1956

2,771,469

QUATERNARY AMMONIUM SALTS OF DELTA-HYDROCARBYOXYPHENYL GAMMA-HYDROXY AMINES

Everett M. Schultz, Ambler, Pa., assignor to Merck & Co., Inc., Rahway, N. J., a corporation of New Jersey No Drawing. Application December 30, 1953,
Serial No. 401,390

6 Claims. (Cl. 260—247.7)

This invention is concerned with quaternary-ammonium salts and in particular with quaternary-ammonium salts having the following general formula:

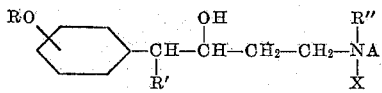

wherein R is selected from the group consisting of lower alkyl, aralkyl and aryl radicals; R' is selected from the group consisting of lower alkyl, unsubstituted mononuclear alicyclic, and mononuclear aralkyl hydrocarbon radicals; R'' is selected from the group consisting of lower alkyl, mononuclear aralkyl hydrocarbon, allyl, and cinnamyl radicals; NA is a secondary amine radical such as a di-lower alkyl amine, piperidyl or morpholinyl radical; and X is an anion, for example an anion derived from an inorganic acid, e. g. a halogen, as chlorine, bromine or iodine, sulfate, phosphate and the like, an anion derived from a low molecular weight carboxylic acid, as a propionate, benzoate and the like; an anion derived from a sulfate ester as methylsulfate; or a sulfonate, e. g., p-toluenesulfonate.

The compounds of this invention are useful in that they possess physiological activity of an anticholinergic nature.

The compounds of this invention are prepared by starting with readily obtainable phenyl acetones having the desired alkoxy, aralkoxy or aryloxy substituent attached to the phenyl nucleus. The selected substituent can be attached in ortho-, meta-, or para-position on the phenyl nucleus and one or more of these radicals and either similar or dissimilar RO- radicals can be attached to the phenyl nucleus. The selected substituted phenyl acetone is allowed to react with a compound having the general formula R'Y in the presence of potassium tertiary butoxide to form a ketone having the general formula:

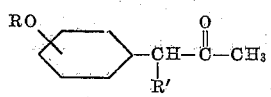

This latter product is then allowed to react with paraformaldehyde and a secondary amine hydrohalide, HNA·Hhal according to the Mannich reaction to form a compound having the general formula:

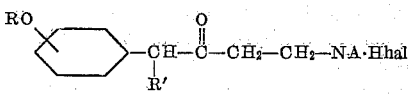

The particular adaptation of the Mannich reaction used in this invention consists in admixing the appropriate ketone with paraformaldehyde and a hydrohalide, e. g. hydrochloride, of the selected secondary amine either with or without an appropriate solvent. The reaction is advantageously carried out in a reaction vessel equipped for reflux. To this mixture is added a small quantity of hydrochloric acid in an aqueous or lower alcoholic medium or in a mixture thereof. The reaction mixture is stirred mechanically and maintained at a temperature of approximately 100° C. for about an hour. On cooling, the reaction product crystallizes and can be purified by recrystallization.

The corresponding carbinol is obtained by hydrogenation of the thus obtained aminoketone hydrohalide advantageously in the presence of platinum as a catalyst and in aqueous or alcoholic solution. The platinum catalyst advantageously can be Adams' platinum catalyst or platinum on alumina. The carbinol compound having the general structural formula:

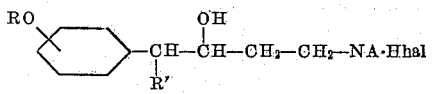

obtained as described above, is quaternized by reaction with a quaternizing agent having the formula R''X. The reaction takes place with or without a solvent and, if desired, at room temperature. If the reaction is conducted at room temperature, it generally is completed within 12 to 24 hours.

If the above reaction has been carried out without a solvent the reaction product is recrystallized from a suitable solvent, such as ethanol, acetone, or ethylacetate or mixtures thereof. If a solvent has been used, purification is effected by one of two methods. If the solvent used is one in which the quaternary ammonium salt is insoluble the salt is separated by filtration and recrystallized as above. If, on the other hand, the solvent is one in which the quatenary ammonium salt is soluble, such as, for example, methanol or ethanol, it is precipitated from the solvent by the addition of a non-polar solvent, such as benzene, ether, or ethyl acetate. The precipitated quarternary ammonium salt is then separated by filtration and recrystallized as above.

It is to be understood that the anion, X, is not of particular importance to the physiological activity of these compounds. If one desires an anion other than halide or methyl sulfate, the desired anion can be conveniently introduced by admixing the quaternary ammonium halide in water solution with silver oxide or silver hydroxide. There will be obtained a precipitate of silver halide which can be removed by filtration leaving a water solution of the quaternary ammonium hydroxide. By neutralization of this hydroxide with an appropriate acid any desired anion can be introduced. In general, the anions derived from inorganic acids, the lower carboxylic acids, and sulfonic acids are preferred.

The compounds of this invention are illustrated by but not necessarily restricted to the following preferred embodiments.

*Example 1.—1(3-hydroxy-4-p-methoxyphenyl-5-methylhexyl)-1-methylpiperidinium iodide*

The above compound was prepared from para-methoxyphenylacetone by the following steps A thru D:

A. *3-p-methoxyphenyl-4-methyl-2-pentanone.*—In a 4-necked flask equipped with a stirrer, reflux condenser, dropping funnel and nitrogen inlet tube, potassium (14.1 g., 0.365 mole) was dissolved in tertiary butyl alcohol under an atmosphere of nitrogen. The solution was heated to boiling and 1-p-methoxyphenyl-2-propanone (60 g., 0.365 mole) was added with stirring. Then isopropyl iodide (62 g., 0.365 mole) was added under the same conditions during 45 minutes and the mixture was boiled for an additional 1.5 hour.

The alcohol then was distilled and water was added to dissolve the precipitate of potassium iodide. The oily product was extracted with ether, the ether solution was separated and dried over sodium sulfate. After evaporation of the ether, 3-p-methoxy-phenyl-4-methyl-2-pentanone was distilled. It boiled at 100–102° C. at 2 mm.

B. *1 - (1 - piperidyl) - 4 - p - methoxyphenyl - 5 - methyl-3-hexanone hydrochloride.*—A mixture of 3-p-methoxyphenyl-4-methyl-2-pentanone (10.3 g., 0.05 mole), piperidine hydrochloride (6.5 g., 0.054 mole), paraformaldehyde (3.0 g., 0.1 mole) and 3N alcoholic hydrogen chloride (1 ml.) was heated with stirring on a steam bath for 1 hour. The solid product thus produced was dissolved in hot isopropyl alcohol (50 ml.) and the solution was allowed to cool. The solid that separated was crystallized again from isopropyl alcohol. The 1-(1 - piperidyl) - 4 - p - methoxyphenyl - 5 - methyl - 3-hexanone hydrochloride so obtained melted at 188–189° C.

C. *1-(1 - piperidyl) - 4 - p-methoxyphenyl - 5 - methyl-3-hexanol hydrochloride.*—The product of step B (6.8 g., 0.02 mole) was dissolved in water (200 ml.) and 5% platinum on alumina catalyst (4 g.) was added. The mixture was shaken in an atmosphere of hydrogen until 490 ml. had been absorbed (2.5 hours). The catalyst was removed by filtration and the aqueous filtrate was made alkaline by addition of sodium hydroxide solution. The base that separated was extracted with ether and the ether solution was dried over sodium sulfate. Gaseous hydrogen chloride then was bubbled into the solution until no further precipitate formed. The precipitated 1-(1-piperidyl) - 4 - p-methoxyphenyl - 5 - methyl - 3 - hexanol hydrochloride was crystallized from ethylacetate and from acetone. It melted at 127–131° C. and is a mixture of the two possible d,l racemates.

D. *1 - (3 - hydroxy - 4 - p - methoxyphenyl - 5 - methylhexyl)-1-methylpiperidinium iodide.*—The salt prepared in step C (10.5 g.) was dissolved in water. The solution was made basic by the addition of 20% sodium hydroxide and the 1-(1-piperidyl)-4-p-methoxyphenyl-5-methyl-3-hexanol was extracted with ether. The ether solution was dried and the ether evaporated. The residue was dissolved in acetone (40 ml.) and methyl iodide (6 g.) was added and the mixture stored at 25° C. After precipitation had ceased, the solid product was collected by filtration and crystallized from 10:1 acetone-isopropyl alcohol. The pure 1-(3-hydroxy-4-p-methoxyphenyl-5-methylhexyl)-1-methylpiperidinium iodide melted at 152–153° C.

*Example II.—1 - (3 - hydroxy - 4 - m - methoxyphenyl-5-methylhexyl)-1-methylpiperidinium iodide.*

The above compound was prepared from m-methoxyphenylacetone by the following steps A thru D:

A. *3 - m - methoxyphenyl - 4 - methyl - 2 - pentanone.*—This compound was prepared from m-methoxyphenylacetone (164 g., 1.0 mole) and isopropyl iodide (187 g., 1.1 mole) in the presence of potassium tertiary butoxide in tertiary butylalcohol (1200 ml.) in the same manner as described in Example I–A. The product, 3-m-methoxy-phenyl-4-methyl-2-pentanone, (176 g., 85%) boiled at 105–110° at 1.5 mm.

B. *1 - (1 - piperidyl) - 4 - m - methoxyphenyl - 5-methyl - 3 - hexanone hydrochloride.*—The ketone prepared in Example II–A (20.6 g., 0.1 mole), piperidine hydrochloride (12.8 g., 0.105 mole), paraformaldehyde (7.5 g., 0.25 mole) and concentrated hydrochloric acid (1 ml.) were dissolved in isopropyl alcohol (70 ml.). The mixture was boiled for 16 hours, cooled and diluted with ether (150 ml.). The precipitate was collected by filtration and then washed with ether. There was obtained 5.2 g. of product, M. P. 151–152° C. after crystallization from isopropyl alcohol.

C. *1 - (1 - piperidyl) - 4 - m - methoxyphenyl - 5-methyl-3-hexanol hydrochloride.*—The beta-amino ketone prepared in Example II–B was converted to the corresponding aminoalcohol in the manner described in Example I–C. The base, obtained in 73% yield, boiled at 167–169° C. at 1.5 mm. and the hydrochloride obtained therefrom melted at 101–105° C. after crystallization from a mixture of ethyl acetate and ether.

D. *1 - (3-hydroxy - 4 - m - methoxyphenyl - 5 - methylhexyl)-1-methyl-piperidinium iodide.*—The base prepared in Example II–C (6.8 g., 0.02 mole) and methyl iodide (4.2 g., 0.03 mole) were added to acetone (10 ml.). The mixture was stored at 25° for 16 hours after which the mixture was chilled and the precipitate was collected. After crystallization from acetone and from isopropyl alcohol, there was obtained 4.8 g. of the desired product, M. P. 118–121° C.

*Example III.—1 - (3 - hydroxy - 4 - p - butoxyphenyl-5-methylhexyl)-1-methylpiperidinium iodide.*

The above compound was prepared from p-butoxybenzaldehyde by the following steps A thru E:

A. *p - Butoxyphenylacetone.*—p - Butoxybenzaldehyde (136 g., 0.765 mole), nitroethane (65 g., 0.85 mole) and n-butylamine (20 ml.) were dissolved in toluene (200 ml.) in a 1 liter flask equipped with an upright condenser having a constant water separator. The mixture was boiled until no more water collected in the trap of the water separator (16 hrs.). The toluene was evaporated under diminished pressure at about 90° C. After cooling, the dark residue was diluted with 100 ml. of hot methanol. The solution was stirred well and chilled to 0° C. The precipitated 1-p-butoxyphenyl-2-nitro-1-propene was collected by filtration and dried in vacuo over phosphorus pentoxide. The yield was 132 g. (73%), M. P. 53–55° C.

The above nitro compound (130 g., 0.55 mole), iron powder, 30 mesh, (210 g.), ferric chloride (1 g.) and water (630 ml.) were placed in a 3-liter round-bottomed flask equipped with a stirrer, dropping funnel and reflux condenser. The mixture was boiled and concentrated hydrochloric acid (96 ml.) was added over a period of 13 hours. The mixture was steam distilled until no more oily material was contained in the distillate. The oily product in the distillate was extracted with ether, the ether solution was dried and the ether was evaporated. The residue was distilled. The product, p-butoxyphenylacetone, was obtained in 73% yield; B. P. 120–123° C.

B. *3 - p - butoxyphenyl - 4 - methyl - 2 - pentanone.*—This product was prepared from p-butoxyphenylacetone and isopropyl iodide in the same manner as the compound in Example I–A. The product 3-p-butoxyphenyl-4-methyl-2-pentanone, obtained in a 71% yield, boiled at 119–124° C. (1 mm.); $N_D^{21}$ 1.4991.

C. *1 - (1 - piperidyl) - 4 - p - butoxyphenyl - 5-methyl-3-hexanone hydrochloride.*—The product prepared in Example III–B (12.4 g., 0.05 mole), piperidine hydrochloride (6.5 g., 0.054 mole), paraformaldehyde (3.0 g., 0.1 mole) and 3N alcoholic hydrogen chloride were heated with stirring for 1 hour. The reaction mixture then was dissolved in hot acetone (200 ml.), filtered and cooled to 0° C. The precipitate that formed was collected by filtration and crystallized from isopropyl alcohol to obtain 5.5 g. of 1-(1-piperidyl)-4-p-butoxyphenyl-5-methyl-3-hexanone hydrochloride; M. P. 177–178° C.

D. *1 - (1 - piperidyl) - 4 - p - butoxyphenyl - 5-methyl-3-hexanol hydrochloride.*—The product prepared in Example III–C was hydrogenated in the manner described in Example I–C. The product, 1-(1-piperidyl)-4-butoxyphenyl-5-methyl-3-hexanol hydrochloride, melted at 161–163° C.

E. *1 - (3 - hydroxy - 4 - p - butoxyphenyl - 5 - methylhexyl)-1-methylpiperidinium iodide.*—The hydrochloride prepared in Example III–D (3 g.) was dissolved in water and the solution was basified by addition of ammonia. The base was extracted with ether and the solution was dried over sodium sulfate. The ether was evaporated and the residue was dissolved in acetone (20 ml.). After adding methyl iodide (3 ml.) the mixture was stored at 25° C. After a short time, several volumes of ether was added to the solution and the precipitate was recovered by filtration. The product, 1-(3-hydroxy-4-p-butoxyphenyl-5-methylhexyl)-1-methylpiperidinium iodide, had M. P. 125–126° C. which was not changed by crystallization from acetone-ether.

*Example IV.—3-hydroxy-4-o-methoxyphenyl - 5 - methylhexyl-dimethyl-cinnamylammonium iodide*

By replacing the 1-p-methoxyphenyl-2-propanone employed in Example I, step A, by an equimolecular quantity of 1-o-methoxyphenyl-2-propanone and allowing it to react with isopropyl iodide in substantially the same manner described in Example I-A, there was obtained 3-o-methoxyphenyl-4-methyl-2-pentanone.

0.05 mole of the thus obtained alpha, alpha-di-substituted ketone was allowed to react with paraformaldehyde (0.1 mole) and 0.05 mole of dimethylamine hydrochloride in substantially the same manner described in Example I-B to produce the hydrochloride of 1-dimethylamino-4-o-methoxyphenol-5-methyl-3-hexanone.

This product was converted to the corresponding carbinol by the same process described in Example I-C and then quaternized with cinnamyl iodide by the same process described in Example I-D, forming 3-hydroxy-4-o-methoxyphenyl-5-methylhexyl dimethylcinnamylammonium iodide.

*Example V.—3-hydroxy-4-(m,p-dimethoxyphenyl)-4-cyclohexyl-butyldimethylallylammonium bromide*

By replacing the 1-p-methoxy-phenyl-2-propanone employed in Example I, step A, by an equimolecular quantity of 1-(m,p-dimethoxyphenyl)-2-propanone and allowing it to react with cyclohexyliodide in substantially the same manner described in Example I-A, there was obtained 1 - (m,p - dimethoxyphenol) - 1 - cyclohexyl - 2 - propanone.

0.05 mole of the thus obtained substituted ketone was allowed to react with paraformaldehyde (0.1 mole) and dimethylamine hydrochloride (0.05 mole) in substantially the same manner described in Example I-B to produce the hydrochloride of 1-dimethylamino-4-(m,p-dimethoxyphenyl)-4-cyclohexyl-3-butanone.

This product was converted to the corresponding carbinol by the same process described in Example I-C and then quaternized with allyl bromide by the same process described in Example I-D, forming 3-hydroxy-4-(m,p-dimethoxyphenyl) - 4 - cyclohexylbutyl - dimethylallylammonium bromide.

*Example VI.—3-hydroxy-4-(m,p-methylenedioxyphenyl)-5-phenyl-amyltrimethylammonium iodide*

By replacing the 1-p-methoxyphenyl-2-propanone employed in Example I, step A, by an equimolecular quantity of 1-(methylenedioxyphenyl)-2-propanone and allowing it to react with benzyl chloride in substantially the same manner described in Example I-A, there was obtained 3-(m,p-methylenedioxyphenyl)-4-phenyl-2 - butanone.

0.05 mole of the thus obtained alpha, alpha-disubstituted ketone was allowed to react with paraformaldehyde (0.1 mole) and 0.05 mole of dimethylamine hydrochloride in substantially the same manner described in Example I-B to produce the hydrochloride of 1-dimethylamino - 4 - (m,p - methylenedioxyphenyl) - 5 - phenyl-3-pentanone.

This product was converted to the corresponding carbinol by the same process described in Example I-C and then quaternized with methyl iodide by the same process described in Example I-D, forming 3-hydroxy-4-(m,p-methylenedioxyphenyl) - 5 - phenylamyltrimethylammonium iodide.

*Example VII.—3-hydroxy - 4 - p - benzyloxyphenylhexyl-dimethylethylammonium iodide*

By replacing the 1-p-methoxyphenyl-2-propanone employed in Example I, step A, by an equimolecular quantity of 1-p-benzyloxyphenyl-2-propanone and allowing it to react with ethyliodide in substantially the same manner described in Example I-A, there was obtained 3-p-benzyloxyphenyl-2-pentanone.

0.05 mole of the thus obtained alpha, alpha-disubstituted ketone was allowed to react with paraformaldehyde (0.1 mole) and 0.05 mole of dimethylamine hydrochloride in substantialy the same manner described in Example I-B to produce the hydrochloride of 1-dimethylamino-4-p-benzyloxyphenyl-3-hexanone.

This product was converted to the corresponding carbinol by the same process described in Example I-C and then quaternized with ethyl iodide by the same process described in Example I-D, forming 3-hydroxy-4-p-benzyloxyphenylhexyldimethylethylammonium iodide.

*Example VIII.—4 - (3 - hydroxy - 4 - p - phenoxyphenyl-4-benzylbutyl)-4-methylmorpholinium iodide*

By replacing the 1-p-methoxyphenyl-2-propanone employed in Example I, step A, by an equimolecular quantity of 1-p-phenoxyphenyl-2-propanone and allowing it to react with benzylbromide in substantially the same manner described in Example I-A, there was obtained 3-p-phenoxyphenyl-4-phenyl-2-butanone.

0.05 mole of the thus obtained alpha, alpha-disubstituted ketone was allowed to react with paraformaldehyde (0.1 mole) and 0.05 mole of morpholine hydrochloride in substantially the same manner described in Example I-B to produce the hydrochloride of 1-(4-morpholinyl)-4-p-phenoxyphenyl-5-phenyl-3-pentanone.

This product was converted to the corresponding carbinol by the same process described in Example I-C and then quaternized with methyl iodide by the same process described in Example I-D, forming 4-(3-hydroxy-4-p-phenoxyphenyl-5-phenylamyl)-4-methylmorpholinium iodide.

*Example IX.—1-(3-hydroxy-4-p-isopropoxyphenyl-5-phenylamyl)-1-methylpiperidinium propionate*

By replacing the 1-p-methoxyphenyl-2-propanone employed in Example I, step A, by an equimolecular quantity of 1-p-isopropoxyphenyl-2-propanone and allowing it to react with benzyl chloride in substantially the same manner described in Example I-A, there was obtained 3-p-isopropoxyphenyl-4-phenyl-2-butanone.

0.05 mole of the thus obtained alpha, alpha-disubstituted ketone was allowed to react with paraformaldehyde (0.1 mole) and 0.05 mole of piperidine hydrochloride in substantially the same manner described in Example I-B to produce the hydrochloride of 1-(1-piperidyl)-4-p-isopropoxyphenyl-5-phenyl-2-pentanone.

This product was converted to the corresponding carbinol by the same process described in Example I-C and then quaternized with methyl iodide by the same process described in Example I-D, forming 1-(3-hydroxy-4-p-isopropoxyphenyl-5-phenylamyl)-1-methylpiperidinium iodide. The solid product was allowed to react with a solution of silver hydroxide to form soluble 1-(3-hydroxy-4-p-isopropoxyphenyl-5-phenylamyl) - 1 - methylpiperidinium hydroxide and a precipitate of silver iodide. The reaction mixture was filtered and the filtrate neutralized with propionic acid yielding 1-(3-hydroxy-4-p-isopropoxyphenyl-5-phenylamyl)-1-methylpiperidinium propionate. The quaternary salt was crystallized by evaporation.

*Example X.—1 - (3 - hydroxy - 4 - m - butoxyphenylhexyl)-1-ethylpiperidinium iodide*

By replacing the 1-p-methoxyphenyl-2-propanone employed in Example I, step A, by an equimolecular quantity of 1-m-butoxyphenyl-2-propanone and allowing it to react with ethyl iodide in substantially the same manner described in Example I-A, there was obtained 3-m-butoxyphenyl-2-pentanone.

0.05 mole of the thus obtained alpha, alpha-disubstituted ketone was allowed to react with paraformaldehyde (0.1 mole) and 0.05 mole of piperidine hydrochloride in substantially the same manner described in Example I-B to produce the hydrochloride of 1-(1-piperidyl)-4-m-butoxyphenyl-3-hexanone.

This product was converted to the corresponding carbinol by the same process described in Example I-C and then quaternized with ethyl iodide by the same process described in Example I-D, forming 1-(3-hydroxy-4-m-butoxyphenylhexyl)-1-ethylpiperidinium iodide.

*Example XI.—1-(3-hydroxy-4-m-propoxyphenyl-5 methylhexyl)-1-benzylpiperidinium bromide.*

By replacing the 1-p-methoxyphenyl-2-propanone employed in Example I, step A, by an equimolecular quantity of 1-m-propoxyphenyl-2-propanone and allowing it to react with isopropyl iodide in substantially the same manner described in Example 1-A, there was obtained 4-methyl-3-m-propoxyphenyl-2-pentanone.

0.05 mole of the thus obtained alpha, alpha-disubstituted ketone was allowed to react with paraformaldehyde (0.1 mole) and 0.05 mole of piperidine hydrochloride in substantially the same manner described in Example I-B to produce the hydrochloride of 1-(1-piperidyl)-4-m-propoxyphenyl-5-methyl-3-hexanone.

This product was converted to the corresponding carbinol by the same process described in Example I-C and then quaternized with benzyl bromide by the same process described in Example I-D, forming 1-(3-hydroxy-4-m-propoxyphenyl-5-methylhexyl)-1-benzyl - piperidinium bromide.

*Example XII.—3-hydroxy-4-p-ethoxylhenyl-5-methylhexyltrimethyl-ammonium methylsulfate.*

By replacing the 1-p-methoxyphenyl-2-propanone employed in Example I, step A, by an equimolecular quantity of 1-p-ethoxylphenyl-2-propanone and allowing it to react with isopropyl iodide in substantially the same manner described in Example I-A, there was obtained 3-p-ethoxyphenyl-4-methyl-2-pentanone.

0.05 mole of the thus obtained alpha, alpha-disubstituted ketone was allowed to react with paraformaldehyde (0.1 mole) and 0.05 mole of dimethylamine hydrochloride in substantially the same manner described in Example I-B to produce the hydrochloride of 1-dimethyl-amino-4-p-ethoxyphenyl-5-methyl-3-hexanone.

This product was converted to the corresponding carbinol by the same process described in Example I-C and then quaternized with dimethylsulfate by the same process described in Example I-D, forming 3-hydroxy-4-p-ethoxyphenyl-5-methylhexyltrimethylammonium methylsulfate.

*Example XIII.—3-hydroxy-4-p-methoxyphenylheptryl-trimethylammonium-p-toluenesulfonate.*

By replacing the 1-p-methoxyphenyl-2-propanone employed in Example I, step A, by an equimolecular quantity of 1-p-methoxyphenyl-2-propanone and allowing it to react with propyl iodide in substantially the same manner described in Example I-A, there was obtained 3-p-methoxyphenyl-2-hexanone.

0.05 mole of the thus obtained alpha, alpha-disubstituted ketone was allowed to react with paraformaldehyde (0.1 mole) and 0.05 mole of dimethylamine hydrochloride in substantially the same manner described in Example I-B to produce the hydrochloride of 1-dimethyl-amino-4-p-methoxyphenyl-3-heptanone.

The product was converted to the correspoding carbinol by the same process described in Example I-C and then quaternized with methyl p-toluenesulfonate by the same process described in Example I-D, forming 3-hydroxy-4-p-methoxyphenylheptyltrimethyl-ammonium p-toluenesulfonate.

While the invention has been illustrated by certain specific compounds, it is to be understood that any compound having the general formula

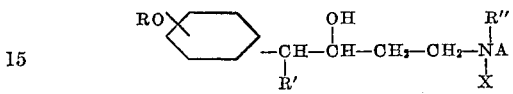

wherein R, R', R" and X have the same meaning previously assigned to each of them is contemplated within the scope of this invention and each of these novel compounds can be made by the procedural steps described in Examples 1–3 by making the proper selection of reactants and, if necessary, making slight modifications in the procedural steps and conditions to adapt the process to the particular reactants employed.

What is claimed is:

1. A quaternary ammonium salt having the structural formula

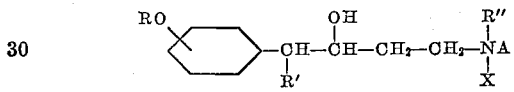

wherein R is selected from the group consisting of lower alkyl, mononuclear carbocylic aryl-lower alkyl and mononuclear carbocyclic aryl radicals; R' is selected from the group consisting of lower alkyl, unsubstituted mononuclear carbocyclic alicyclic and mononuclear carbocyclic aryl-lower alkyl radicals; R" is selected from the group consisting of lower alkyl, mononuclear carbocyclic aryl-lower alkyl, allyl and cinnamyl radicals, the aryl and alicyclic moieties of the radicals represented by R, R' and R" being unsubstituted and containing six atoms in the ring nucleus; NA is selected from the group consisting of di-lower alkyl amine, piperidyl and morpholinyl radicals; and X is an anion.

2. 1-(3-hydroxy-4-p-methoxyphenyl-5-methylhexyl)-1-methlypiperidinium iodide.

3. 1-(3-hydroxy-4-m-methoxyphenyl-5-methylhexyl)-1-methylpiperidinium iodide.

4. 1-(3-hydroxy-4-p-butoxyphenyl - 5 - methylhexyl)-1 methylpiperidinium iodide.

5. 3 - hydroxy-4-p-benzyloxyphenylhexyldimethylethyl-ammonium iodide.

6. 4-(3-hydroxy-4-p-phenoxyphenyl-4-benzylbutyl)-4-methylmorpholinium iodide.

References Cited in the file of this patent

UNITED STATES PATENTS 2,665,278   Schultz _____ Jan. 5, 1954

OTHER REFERENCES

Breslow: JACS 67:1473, (Table I).
Mannich: C. A. 22:964.